(12) United States Patent
Ramachandran et al.

(10) Patent No.: US 8,145,149 B2
(45) Date of Patent: Mar. 27, 2012

(54) OPERATING A VOLTAGE REGULATOR AT A SWITCHING FREQUENCY SELECTED TO REDUCE SPURIOUS SIGNALS

(75) Inventors: Ravi Ramachandran, San Jose, CA (US); Frank Sasselli, Los Altos, CA (US)

(73) Assignee: R2 Semiconductor, Inc, Sunnyvale, CA (US)

( * ) Notice: Subject to any disclaimer, the term of this patent is extended or adjusted under 35 U.S.C. 154(b) by 132 days.

(21) Appl. No.: 12/818,087

(22) Filed: Jun. 17, 2010

(65) Prior Publication Data

US 2011/0312287 A1 Dec. 22, 2011

(51) Int. Cl.
*H04B 1/04* (2006.01)

(52) U.S. Cl. ............... 455/114.1; 455/114.2; 455/114.3; 455/115.1; 455/127.1; 455/127.2; 455/63.1; 323/282; 323/283; 327/102; 327/108; 327/124; 327/127; 327/530; 327/535; 330/132; 330/133; 330/135; 330/136; 330/137

(58) Field of Classification Search .................. 455/63.1, 455/100, 114.1, 114.2, 114.3, 127.1, 127.2, 455/127.3, 127.5, 571, 572, 115.1–115.3; 323/282, 283; 330/127–142; 327/102, 103, 327/108, 113, 119, 124, 530, 534–536
See application file for complete search history.

(56) References Cited

U.S. PATENT DOCUMENTS

| | | | |
|---|---|---|---|
| 4,879,758 A | 11/1989 | DeLuca et al. | |
| 5,263,055 A | 11/1993 | Cahill | |
| 5,519,889 A | 5/1996 | Hipp | |
| 5,870,294 A | 2/1999 | Cyr | |
| 5,914,588 A | 6/1999 | Jiang | |
| 5,926,514 A | 7/1999 | Meador et al. | |
| 6,204,649 B1 | 3/2001 | Roman | |
| 6,285,568 B1 | 9/2001 | Taurand | |
| 6,314,008 B1 | 11/2001 | Bao et al. | |
| 6,330,463 B1* | 12/2001 | Hedrich | ........................ 455/573 |
| 6,339,471 B1* | 1/2002 | Morita | ........................ 356/401 |
| 6,345,172 B1 | 2/2002 | Hirai et al. | |
| 6,400,211 B1* | 6/2002 | Yokomizo et al. | ............ 327/536 |

(Continued)

FOREIGN PATENT DOCUMENTS

EP 1953922 8/2008

OTHER PUBLICATIONS

"Integrated DC-DC Converter Design for Improved WCDMA Power Amplifier Efficiency in SiGe BiCMOS Technology" D. Guckenberger and K. Kornegay 2003 International Symposium on Low Power Electronics and Design (ISLPED) p. 449.

(Continued)

*Primary Examiner* — Tuan A Tran
(74) *Attorney, Agent, or Firm* — Brian R Short

(57) ABSTRACT

Embodiments for at least one method and apparatus of a wireless transceiver are disclosed. For one embodiment, the wireless transceiver includes a transmit chain, wherein the transmit chain includes a power amplifier. The wireless transceiver additionally includes a receiver chain that is tunable to receive wireless signals over at least one of multiple channels, wherein the multiple channels are predefined. Further, the wireless transceiver includes a voltage converter. The voltage converter provides a supply voltage to the power amplifier, and operates at a single switching frequency, wherein the single switching frequency and all harmonics of the single switching frequency fall outside of the multiple channels.

24 Claims, 15 Drawing Sheets

U.S. PATENT DOCUMENTS

| | | |
|---|---|---|
| 6,882,548 B1 | 4/2005 | Jacobs et al. |
| 6,969,978 B2 | 11/2005 | Dening |
| 6,980,039 B1 | 12/2005 | Dening |
| 6,999,723 B2 | 2/2006 | Kusbel et al. |
| 7,026,797 B2 * | 4/2006 | McCune, Jr. ............... 323/225 |
| 7,116,946 B2 * | 10/2006 | Tanabe et al. ............... 455/91 |
| 7,197,290 B2 | 3/2007 | Patel |
| 7,227,342 B2 * | 6/2007 | McCune, Jr. ............... 323/225 |
| 7,233,130 B1 | 6/2007 | Kay |
| 7,457,592 B2 * | 11/2008 | Arayashiki ............... 455/108 |
| 7,529,528 B2 * | 5/2009 | Uratani et al. ............ 455/127.5 |
| 7,589,508 B2 | 9/2009 | Machesney |
| 7,782,141 B2 * | 8/2010 | Witmer et al. ............... 330/297 |
| 7,848,715 B2 * | 12/2010 | Boos ............... 455/91 |
| 2003/0104780 A1 | 6/2003 | Young |
| 2004/0137852 A1 | 7/2004 | Shi et al. |
| 2006/0250825 A1 | 11/2006 | Grigore |
| 2008/0205095 A1 | 8/2008 | Pinon et al. |

OTHER PUBLICATIONS

"A Spurious Emission Reduction Technique for Power Amplifiers Using Frequency Hopping DC-DC Converters" J. Chen, P. Liu and Y. Chen 2009 Radio Frequency Integrated Circuit (RFIC) Conference, paper MRO2C-2.

"EMI Suppression with Switching Frequency Modulated DC-DC Converters" M. Vilathgamuwa, J. Deng and K. Tseng IEEE Industry Applications Magazine Nov./Dec. 1999 p. 27.

"A Low Noise, High Efficiency Two Stage Envelope Modulator Structure for EDGE Polar Modulation", J. Qin, R. Guo, J. Park, A. Huang International Symposium on Circuits and Systems (ISCAS) 2009, p. 1089.

PCT/US2011/038230, Notification of Transmittal of the International Search Report and the Written Opinion of the International Searching Authority, or the Declaration, Dated: Dec. 20, 2011.

* cited by examiner

Exemplary frequency bands of interest. All frequencies in MHz.

| Band # | Name | Uplink | | Downlink | | TX/RX spacing | RF Bandwidth |
|---|---|---|---|---|---|---|---|
| 1 | IMT | 1920 | 1980 | 2110 | 2170 | 190 | 60 |
| 2 | PCS | 1850 | 1910 | 1930 | 1990 | 80 | 60 |
| 3 | DCS | 1710 | 1785 | 1805 | 1880 | 95 | 75 |
| 5 | Cell | 824 | 849 | 869 | 894 | 45 | 25 |
| 8 | GSM | 880 | 915 | 925 | 960 | 45 | 35 |

FIGURE 4

Example of harmonic test table for arbitrarily-chosen example switching frequency of 78 MHz, uplink (TX) bands.

| Harmonic Order | Frequency (MHz) | In IMT Uplink Band | In PCS Uplink Band | In DCS Uplink Band | In Cell Uplink Band | In GSM Uplink Band |
|---|---|---|---|---|---|---|
| 1 | 78 | 0 | 0 | 0 | 0 | 0 |
| 2 | 156 | 0 | 0 | 0 | 0 | 0 |
| 3 | 234 | 0 | 0 | 0 | 0 | 0 |
| 4 | 312 | 0 | 0 | 0 | 0 | 0 |
| 5 | 390 | 0 | 0 | 0 | 0 | 0 |
| 6 | 468 | 0 | 0 | 0 | 0 | 0 |
| 7 | 546 | 0 | 0 | 0 | 0 | 0 |
| 8 | 624 | 0 | 0 | 0 | 0 | 0 |
| 9 | 702 | 0 | 0 | 0 | 0 | 0 |
| 10 | 780 | 0 | 0 | 0 | 0 | 0 |
| 11 | 858 | 0 | 0 | 0 | 0 | 0 |
| 12 | 936 | 0 | 0 | 0 | 0 | 0 |
| 13 | 1014 | 0 | 0 | 0 | 0 | 0 |
| 14 | 1092 | 0 | 0 | 0 | 0 | 0 |
| 15 | 1170 | 0 | 0 | 0 | 0 | 0 |
| 16 | 1248 | 0 | 0 | 0 | 0 | 0 |
| 17 | 1326 | 0 | 0 | 0 | 0 | 0 |
| 18 | 1404 | 0 | 0 | 0 | 0 | 0 |
| 19 | 1482 | 0 | 0 | 0 | 0 | 0 |
| 20 | 1560 | 0 | 0 | 0 | 0 | 0 |
| 21 | 1638 | 0 | 0 | 0 | 0 | 0 |
| 22 | 1716 | 0 | 0 | 1 | 0 | 0 |
| 23 | 1794 | 0 | 0 | 0 | 0 | 0 |
| 24 | 1872 | 0 | 1 | 0 | 0 | 0 |
| 25 | 1950 | 1 | 0 | 0 | 0 | 0 |
| 26 | 2028 | 0 | 0 | 0 | 0 | 0 |
| 27 | 2106 | 0 | 0 | 0 | 0 | 0 |
| 28 | 2184 | 0 | 0 | 0 | 0 | 0 |
| 29 | 2262 | 0 | 0 | 0 | 0 | 0 |
| 30 | 2340 | 0 | 0 | 0 | 0 | 0 |
| TOTALS: | | 1 | 1 | 1 | 0 | 0 |

FIGURE 5

Frequency ranges, in MHz, where no harmonics are present in Uplink or Downlink bands. (Bands < 0.2 MHz wide are not included.)

| No Uplink (TX) Harmonics | No Downlink (RX) Harmonics | No Uplink or Downlink Harmonics |
|---|---|---|
|  | 83.5 to 83.9 |  |
|  | 90.5 to 91.7 |  |
| 106.2 to 106.6 | 99.5 to 100.2 |  |
|  | 127.8 to 128.6 |  |
|  | 137.2 to 137.8 |  |
|  | 144.7 to 144.8 |  |
| 141.6 to 142.3 |  |  |
| 152.5 to 154.1 |  |  |
|  | 160.0 to 160.8 |  |
|  | 171 to 173.8 |  |
| 183.1 to 185.0 |  |  |
| 198.4 to 205.5 | 199.0 to 200.5 | 199.0 to 200.5 |
|  | 208.9 to 211.0 |  |
| 212.3 to 213.3 |  |  |
|  | 223.6 to 225.6 |  |
| 228.8 to 231.2 |  |  |
| 238.8 to 240.0 |  |  |
| 255 to 264.2 | 248.8 to 257.8 | 255 to 257.8 |

FIGURE 9

Switching frequency ranges (MHz) and impact on paired channel.

| Number | Range | Spur Description | Impacted Band (see Figure 4) | No Spur on Paired Channel |
|---|---|---|---|---|
| 1 | 20 to 25 | $2*f_{sw} + f_c$ | 5 | 28.4 to 29.9 |
| 2 | 25 to 28.33 | $3*f_{sw} + f_c$ | 2 | 33.4 to 37.4 |
| 3 | 30 to 33.33 | $3*f_{sw} + f_c$ | 3 | 50.1 to 61.6 |
| 4 | 37.5 to 42.5 | $2*f_{sw} + f_c$ | 2 | 65.1 to 75.1 |
| 5 | 40 to 50 | $f_{sw} + f_c$ | 5 | 85.1 to 89.9 |
| 6 | 61.7 to 65 | $3*f_{sw} + f_c$ | 1 | 100.1 to 184.9 |
| 7 | 75 to 85 | $f_{sw} + f_c$ | 2 | > 195.1 |
| 8 | 90 to 100 | $f_{sw} + f_c$ | 3 | |
| 9 | 92.5 to 97.5 | $2*f_{sw} + f_c$ | 1 | |
| 10 | 185 to 195 | $f_{sw} + f_c$ | 1 | |

FIGURE 10

Frequency ranges, in MHz, with no harmonics in TX or RX bands, and interference with paired receive channel where relevant.

| No Uplink (TX) Harmonics | Paired Channel Impact | No Downlink (RX) Harmonics | Paired Channel Impact | No Uplink or Downlink Harmonics | Paired Channel Impact |
|---|---|---|---|---|---|
| | | 83.5 to 83.9 | band 2 | | |
| | | 90.5 to 91.7 | band 3 | | |
| 106.2 to 106.6 | | 99.5 to 100.2 | band 3 to 100.0 | | |
| | | 127.8 to 128.6 | | | |
| | | 137.2 to 137.8 | | | |
| | | 144.7 to 144.8 | | | |
| 141.6 to 142.3 | | | | | |
| 152.5 to 154.1 | | | | | |
| | | 160.0 to 160.8 | | | |
| | | 171 to 173.8 | | | |
| 183.1 to 185.0 | 185 at channel edge | | | | |
| 198.4 to 205.5 | | 199.0 to 200.5 | | 199.0 to 200.5 | |
| | | 208.9 to 211.0 | | | |
| 212.3 to 213.3 | | | | | |
| | | 223.6 to 225.6 | | | |
| 228.8 to 231.2 | | | | | |
| 238.8 to 240.0 | | | | | |
| 255 to 264.2 | | 248.8 to 257.8 | | 255 to 257.8 | |

FIGURE 11

Switching frequency ranges, in MHz, and impact on transmit band and paired channel.

| Range | Spurs in Uplink (TX) Band |
|---|---|
| 28.4 – 29.9 | 1,2,3,8 |
| 33.4 – 37.4 | 1,2,3,8 |
| 50.1 – 61.6 | 1,2,3 |
| 65.1 – 75.1 | 3 |
| 85.1 – 89.9 | |
| 100.1 – 184.9 | |
| >195.1 | |

FIGURE 12

Mixing products of carrier and harmonics potentially lying within various downlink (RX) bands, for the ranges examined in Figure 12.

| Range (MHz) | BAND | | | | |
|---|---|---|---|---|---|
| | IMT | PCS | DCS | CELL | GSM |
| 28.4 to 29.9 | 5,6,7,8 | 1,2,3,4 | 11,12,13,14,15 | 1,2 | 1,2 |
| 33.4 to 37.4 | 4,5,6,7 | 1,2,3,4 | 9,10,11,12,13 | 1,2 | 1,2 |
| 50.1 to 61.6 | 2,3 | 1,2 | 6,7,8 | 1 | 1 |
| 65.1 to 75.1 | 2,3 | 1,2 | 5,6 | 1 | 1 |
| 85.1 to 89.9 | 2 | 1 | 4,5 | | |
| 100.1 to 184.9 | 1,2 | 1 | 2,4 | | |
| >195.1 (to 260) | | | 1,2 | | |

FIGURE 13

OPERATING A VOLTAGE REGULATOR AT A SWITCHING FREQUENCY SELECTED TO REDUCE SPURIOUS SIGNALS

FIELD OF THE DESCRIBED EMBODIMENTS

The described embodiments relate generally to power conversion. More particularly, the described embodiments relate to methods and apparatus for operating a voltage regulator at a switching frequency that mitigates levels of spurious signals.

BACKGROUND

Communications radios, such as those employed in mobile cellular handsets and similar devices, must be capable of receiving very small signals with small relative bandwidth, and are thus sensitive to periodic disturbances of any kind whose frequency lies within the wanted received channel. In addition to external sources of interference, most radios contain internal frequency generators. These internal generators include local oscillators used both for creating signals to be transmitted, and converting received signals to a more convenient lower frequency (the intermediate frequency or IF). Most modern radios contain digital circuitry, whose operation is synchronized by one or more clock oscillators. In addition, in many cases, circuitry within the radio requires DC supply voltages differing from the main power supply or supplies (e.g. a battery), requiring conversion and regulation. DC-DC conversion is often performed by switch-mode converters, which provide superior efficiency and other benefits relative to linear regulators. Switch-mode converters, however, may generate periodic signals, both through their internal operations and through imposition of corresponding periodic variation (ripple) in the voltage they deliver to a load, which can also represent a source of internal interference.

Undesired periodic signals are generally referred to as spurious signals, or spurs. Internal oscillators may generate spurs not merely at their operating frequency, but at other frequencies, through two basic mechanisms. The first mechanism is the creation of harmonics of the fundamental frequency. Harmonics may be present in the source signal if it is not sinusoidal. For example, a square wave may be used as a reference signal for timing control in a switch-mode converter. Square waves are composed of a signal at the fundamental frequency, plus signals at odd harmonics thereof, decreasing in inverse proportion to the harmonic multiplier. Internally, a switch-mode converter often employs a sawtooth ramp to control its switch state, producing a similar spectrum with both even and odd harmonics. Finally, the output waveform of, for example, a buck converter is a triangle wave, with alternating increasing and decreasing currents whose slope is controlled by the output inductor and capacitor; such a wave contains odd harmonics whose amplitude decreases with the square of the harmonic multiplier.

In addition to harmonics present in the source signal, any nonlinear circuit response, such as a limiting process or a mixing process, can produce additional harmonics of an input signal. Finally, nonlinear processes can mix two signals at differing frequencies together, in principle resulting in signals with frequency components at all frequencies of the form:

$$f_{spur} = n \cdot f_1 + m \cdot f_2$$

where $f_{spur}$ is the spurious signal frequency, n and m are integers (which may be negative), and $f_1$ and $f_2$ are the frequencies of the two signals participating in the nonlinear mixing process. While the discussion of the exemplary method focuses on integer harmonics, non-integer harmonics are also possible in special cases. For example, DC-DC switch-mode converters can display sub-harmonic oscillations near their upper or lower duty cycle limits, or when interferers enter the control circuitry. Precautions may be taken in design and operation to avoid sub-harmonic oscillations, or their presence can be taken into account in the method described below.

Spurious signals have two general classes of deleterious effects. The first and usually most important is desensitization of the receiver. A spurious signal at the frequency the receiver is tuned to may impair the ability to recognize and decode the wanted signal. Extremely small spurious signals can cause problems. For example, consider a WCDMA receiver with sensitivity is limited by thermal noise. The signal bandwidth is about 3.8 MHz, so thermal noise entering the receiver at room temperature is about −174 dBm/Hz+66 dB≈−108 dBm. If the receiver noise figure is 8 dB, the noise floor in the receiver channel is about −100 dBm (that is, $10^{-13}$ Watts). Any spurious signal larger than −100 dBm will degrade receiver sensitivity. In a superheterodyne receiver, in which the received signal is converted to a lower intermediate frequency (IF), spurious signals lying on the converted frequency (IF) may also interfere with the wanted signal. IF signal levels are higher than RF signals, since some gain has usually been applied to the signal before conversion, but IF frequencies are lower than RF frequencies and thus more susceptible to interference from harmonics of local signals.

The second class of problems arises from spurs which affect the transmitted signal, for that class of radios which act as transceivers. Spurious transmitted signals that are outside the intended transmission channel may interfere with the ability of neighboring radios to receive their wanted signals, and are thus often subject to regulatory requirements. Spurious transmitted signals within the intended channel may degrade the quality of the transmitted signal, as measured by the error vector magnitude (the difference between the intended and actual phase and amplitude of the transmitted signal), carrier feedthrough, or other measures of signal fidelity. Degraded signal quality gives rise to high link error rates and degraded performance.

Traditionally, DC-DC converters employed in radios have operated at switching frequencies from a few tens of kHz to a few MHz. Resulting spurious harmonics extend up to a few tens to a few hundred MHz., and are of special concern within the IF chain, where the wanted channel may lie on a harmonic frequency. When mixed with a carrier, as may occur due to residual nonlinearity when a switching regulator is used to supply DC power to a transmit power amplifier, a number of spurs near the carrier frequency can be produced. Various approaches are known in the art to minimize spurs due to switch-mode converters. Converter output ripple can be reduced by using multiple conversion blocks operating with different phase relationships arranged to partially or completely cancel output ripple. Output ripple may be reduced using a supplementary linear regulator in shunt with the switch mode regulator. The impact of spurs resulting from a switched-mode regulator may be reduced by varying the switching frequency in various ways to spread the spurious output over a wider channel than that of interest. Finally, the frequency of local clocks such as that of a switched-mode converter may be intentionally and dynamically changed to avoid wanted channels.

Increases in switching frequencies provide a number of potential advantages for switch-mode converters, including reduced size and cost of external components and faster transient response. Recent developments have led to switching frequencies of tens to hundreds of MHz, as described in the copending application Ser. No. 12/646,213, titled "Stacked NMOS DC-to-DC Power Conversion", filed Dec. 23, 2009, which is herein incorporated by reference. However, when switching frequency is increased, careful attention must be paid to resulting spurious signals. Harmonic frequencies increase proportionally to the increase in the fundamental, and may extend up to several GHz, so that they are more likely to lie directly within the wanted receive channel rather than merely within the IF channel. In the case of frequency-division duplexed (FDD) radios with simultaneous transmission and reception, the standard operating procedure for CDMA and WCDMA cellular handsets, mixing products with the carrier frequency, of particular importance in the case where the switched-mode converter supplies an RF power amplifier, may lie on the paired receive channel. When this occurs, desensitization will result regardless of the current radio, channel in use, since the mixing product with the carrier, and the paired receive channel, will both maintain a constant offset from the carrier as it changes frequency. The importance of switching frequency selection for high-frequency converters has been recognized, but only in the context of avoiding harmonics within the transmit band. A more thorough and systematic approach is required to minimize the deleterious effects of spurious signals, so that the benefits of high switching frequency may be realized.

It is desirable to have methods and apparatuses for operating switching of a voltage regulator at a switching frequency that provides a desired level of spurious signal degradation of receive and/or transmit signals of a transceiver that uses the voltage regulator.

SUMMARY

An embodiment includes a wireless transceiver. The wireless transceiver includes a transmit chain, wherein the transmit chain includes a power amplifier. The wireless transceiver additionally includes a receiver chain that is tunable to receive wireless signals over at least one of multiple channels, wherein the multiple channels are predefined. Further, the wireless transceiver includes a voltage converter. The voltage converter provides a supply voltage to the power amplifier, and operates at a single switching frequency, wherein the single switching frequency and all harmonics of the single switching frequency fall outside of the multiple channels.

Another embodiment includes wireless transceiver. The wireless transceiver includes a transmit chain, wherein the transmit chain includes a power amplifier. The wireless transceiver additionally includes a receiver chain that is tunable to receive wireless signals over at least one of multiple receive channels, wherein the multiple receive channels are predefined and at any time each of the multiple receive channels is a paired channel. Further, the wireless transceiver includes a voltage converter. The voltage converter provides a supply voltage to the power amplifier, and operates at a single switching frequency, wherein mixing products between transmitter carrier frequencies and the single switching frequency, and the harmonics of the single switching frequency, are located outside of paired receive channels.

Another embodiment includes a voltage regulator. The voltage regulator includes switch elements connected between an input voltage and an output voltage. The output voltage is generated through the use of an energy storage element, and through controlled closing and opening of the switch elements at a single switching frequency. A power amplifier supply voltage for a wireless device is generated based upon the output voltage. The single switching frequency, and all harmonics of the single switching frequency fall outside of multiple predefined receive channels of the wireless device.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a table that includes exemplary frequency bands of interest.

FIG. 5 is a table that includes examples of a harmonic test for an arbitrarily chosen switching frequency of 78 MHz uplink transmission bands.

FIG. 9 is a table that shows frequency ranges where no harmonics of switching frequency are present in transmitter or receiver bands.

FIG. 10 is a table that shows examples of switching frequency ranges, and a corresponding impact on pair channels.

FIG. 11 is a table that shows examples of switching frequencies with no harmonics in transmitter or receiver bands.

FIG. 12 a table that shows examples of switching frequency ranges and the impact on transmit band.

FIG. 13 is a table that shows mixing products of transmitter carrier frequencies and harmonics that potentially fall within downlink receive band for ranges depicts in FIG. 9.

DETAILED DESCRIPTION

Figure 1:
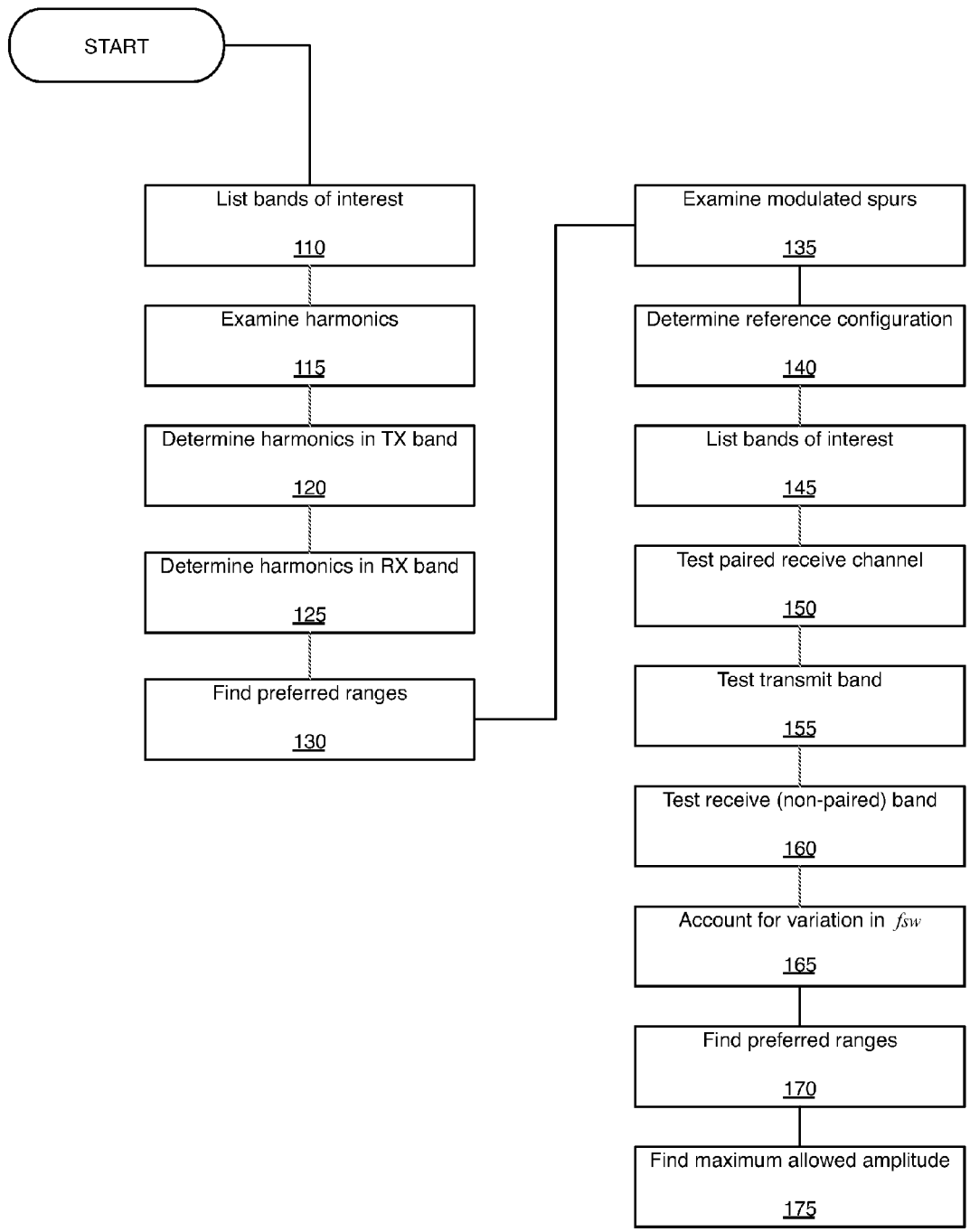
FIG. 1 is a flow chart that includes steps of an example of a method of selecting an operational frequency of a switching voltage regulator.

The described embodiments provide examples of implementations of voltage regulators located within, for example, mobile devices. The voltage regulators have switching frequencies that are selected to minimize and/or eliminate spurious signals within pass-bands (receive and/or transmit) of the mobile devices due to the switching of the voltage regulators.

Accordingly, an embodiment includes a wireless transceiver that includes a voltage regulator. The wireless transceiver includes a transmit chain, wherein the transmit chain includes a power amplifier. Further, the wireless transceiver includes a receiver chain, wherein the receiver chain is tunable to receive wireless signals over at least one of multiple predefined channels. The voltage converter provides a supply voltage to the power amplifier. The voltage converter operates at a single switching frequency, wherein the single switching frequency, and all harmonics of the single switching frequency fall outside of the multiple channels.

As will be shown and described, for an embodiment, the multiple predefined channels include at least two of bands 1, 2, 3, 5, 8 as defined by 3GPP (3rd Generation Partnership Project). For a specific embodiment, the single switching frequency is selected from within a range of 90.5 MHz to 91.7 MHz. For another specific embodiment, the single switching frequency is selected from within a range of 99.5 MHz to 100.2 MHz.

For an embodiment, mixing products between the single switching frequency and carrier frequencies of the transceiver fall outside of the paired receive channels. For a specific embodiment, the single switching frequency is selected from within a range of 171 MHz to 173.8 MHz.

For an embodiment, the receive channels are paired with transmit channels. That is, for example, in an FDD (Frequency Domain Duplex) a transceiver has a receive channel that is paired with a separate (different) transmission channel, which allows for simultaneous two-way wireless communication. For an embodiment, harmonics of the single switching frequency fall outside of the transmit bands of the transceiver as well as the receive bands. For a specific embodiment, harmonics of the single switching frequency fall outside of at least two transmit bands of bands 1, 2, 3, 5, 8 as defined by 3GPP (3rd Generation partnership Project).

An embodiment includes mixing products between the single switching frequency and carrier frequencies of the transceiver falling outside of the paired receive channels. For a specific embodiment, the single switching frequency is selected from within a range of 255.0 MHz to 257.8 MHz. For another specific embodiment, the single switching frequency is selected from within a range of 199.0 MHz to 200.5 MHz.

Another embodiment includes mixing products between transmitter carrier frequencies and the single switching frequency, and the harmonics of the single switching frequency, being located outside of paired receive channels. As previously described, for a specific embodiment the multiple channels include at least two of bands 1, 2, 3, 5, 8 as defined by 3GPP (3rd Generation Partnership Project). For a specific embodiment, the single switching frequency is operative between 33.33 MHz and 37.5 MHz. For another specific embodiment, the single switching frequency is operative between 28.33 MHz and 30.0 MHz.

FIG. 1 is a flow chart that includes steps of an example of a method of selecting an operational frequency of a switching voltage regulator. As stated, embodiments include the voltage regulator being used within a wireless mobile device. An initial step 110 includes determining the frequency bands of the wireless mobile device of interest and their characteristics. All frequency bands that may be used in the envisioned application should be considered, with possible prioritization based on considerations such as the frequency with which each may be used in a given device, or utilization of specific bands within a given market. Within each frequency band, it is necessary to elucidate applicable limitations on spurious emissions. Limits on emissions may derive from regulatory requirements of governmental bodies having jurisdiction over radio operation in the locations where radio devices are to be used. Emission limits may also be set by standards bodies defining specific communications protocols. Where limits differ, the most stringent requirement should be employed unless it is known to be inapplicable.

Once bands of interest have been established, harmonics may be examined first (step 115). A step 120 includes determining harmonics of the switching frequency that are located within a transmit (TX) band of the wireless mobile device. A step 125 includes determining harmonics of the switching frequency that are located within receive (RX) band of the wireless mobile device. This analysis results in preferred ranges of switching frequencies (step 130)

While the intensity of harmonics at various locations within a given device, or radiated from a device, are a very complex function of the exact device configuration, the possible harmonic frequencies are simple integer multiples of the fundamental frequency. In addition, as noted above, in some cases a specific signal may have properties that ensure the absence or near-absence of some harmonic frequencies; for example, a pure square wave produces only odd-numbered harmonics. Therefore it is straightforward to establish for each possible range of fundamental frequencies whether harmonics are possible within the bands of interest. Frequency bands in which such harmonics are not possible, if found, provide a first criterion for choosing the operating frequency for a switching converter.

Attention next turns to the possible mixing products (step 135). While a great number of mixing products may result from all the frequencies present within a given device or system, the most important spurious signals are likely to result from the strongest signals in the system. In the case of a transmitter or transceiver, the strongest signal is typically the transmitted carrier signal. Any modulation or mixing of this transmitted carrier with any other undesired frequency will result in new spurious emissions located at the sum and difference of the carrier frequency and the frequency of the undesired signal.

A step 140 includes determining a reference configuration of the wireless mobile device. A step 145 includes determining (listing) frequency bands of interest. A step 150 includes testing (determining mixing products) of a paired receive channel. A step 155 includes testing the transmit channel. A step 160 can include testing the receive channel (not as a paired channel). A step 165 includes continuing the modulated spurs while accounting for frequency variations of the switching frequency. A step 170 identifying based on the testing, preferred ranges of switching frequencies. A step 175 can include adjusting the preferred ranges based on determined maximum allowed values of the amplitudes of the spurious signals.

Figure 2:
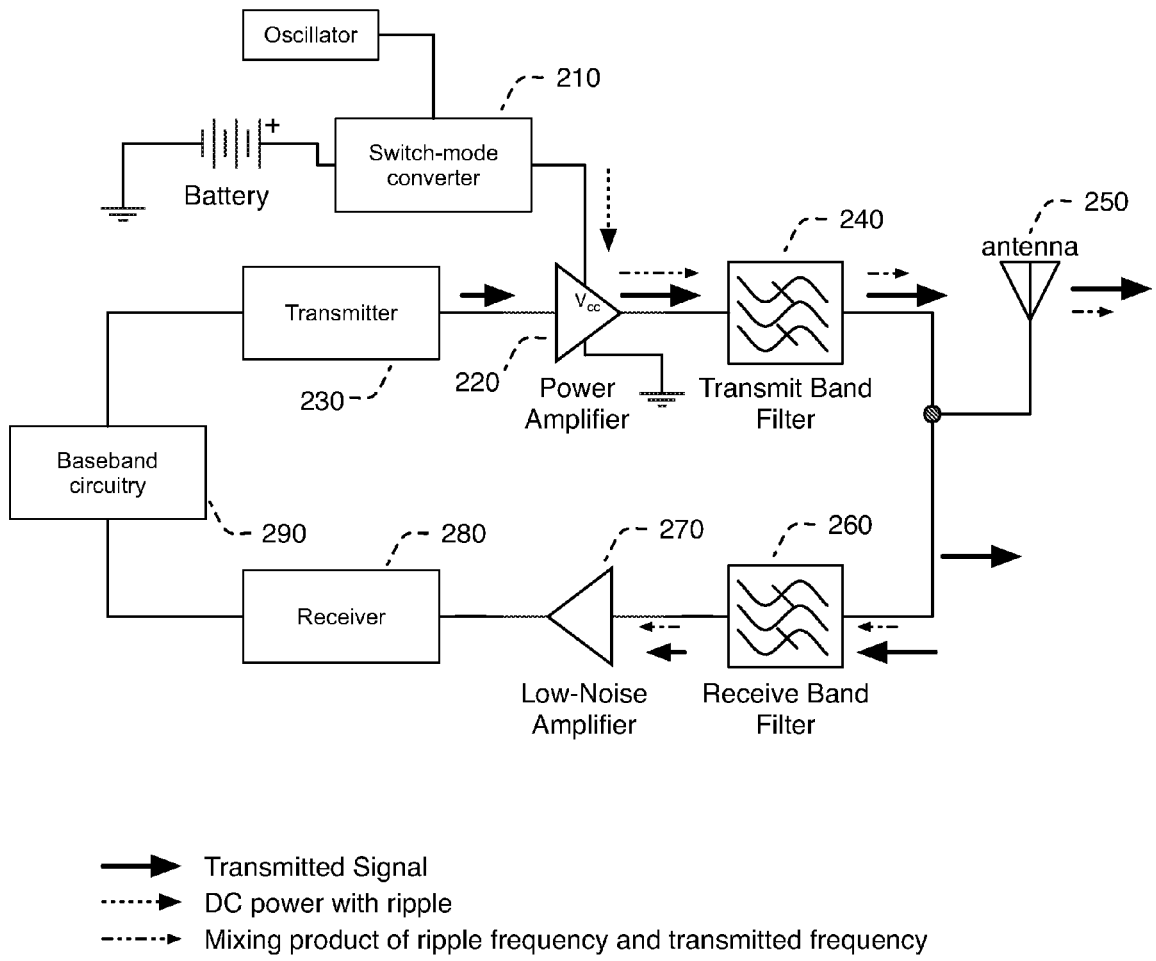
FIG. 2 shows an example of a transceiver in which the described embodiments are operable.
Figure 15:
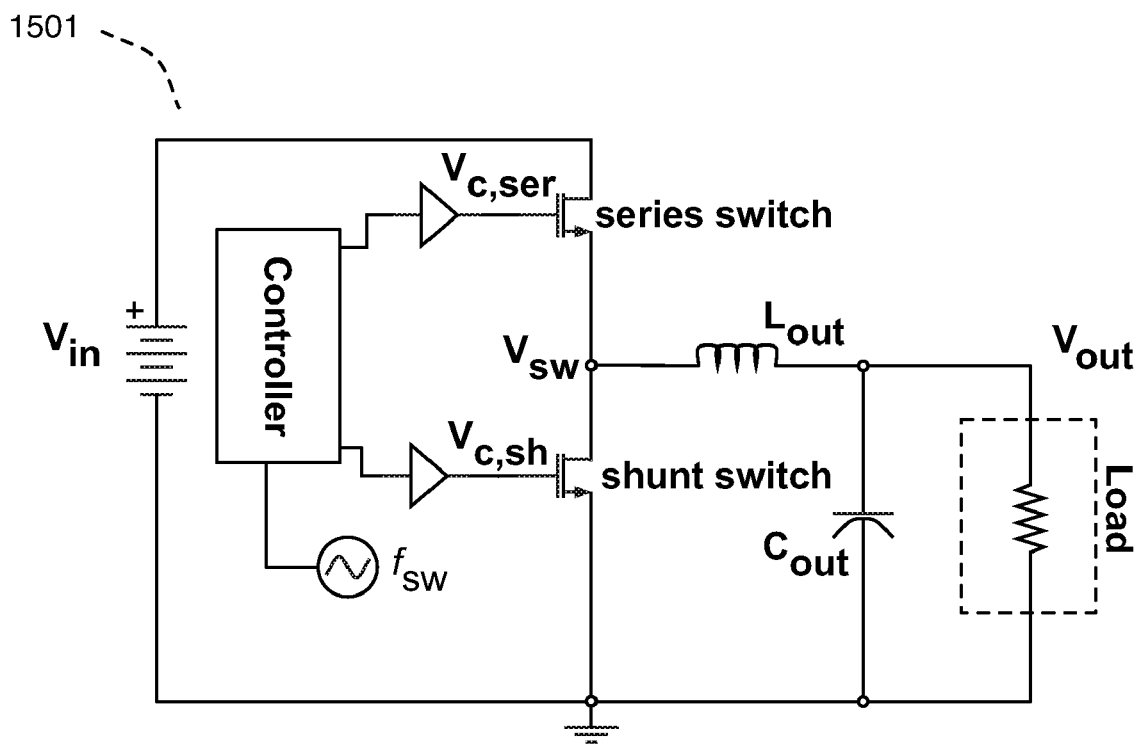
FIG. 15 shows an example of a switching voltage regulator operating at a selected switching frequency.

FIG. 2 shows an example of a transceiver in which the described embodiments are operable. As shown, switch-mode converter 210 (an example of a switch-mode converter is shown in FIG. 15) is used to supply DC power. The switch-mode converter 210 has a switching frequency (Fsw), and provides a DC voltage containing some ripple component at the switching frequency and possible harmonics, to a final transmit power amplifier 220 in a frequency-division duplex radio, such as a mobile cellular handset, in which transmission and reception may take place simultaneously. A transmitted signal (from transmitter 230) is directed to the power amplifier 220 for the final stage of amplification. The power of the output signal from the power amplifier 220 may vary over a wide range, due for example to intentional power control used in Code Division Multiple Access (CDMA) systems to balance received power at the base station from multiple users. For example, the output power in a WCDMA system may range from less than 0 dBm (1 mW) to 24 dBm (¼ Watt). Frequency selection is based on the spurious signals expected at maximum output power. For a given power amplifier, one may characterize the dependence of output mixing products on the amplitude of ripple present in the DC power from the supply, and the nominal output power of the amplifier.

The signal from the power amplifier 220 passes through a band selection filter 240, whose purpose is to pass only the fundamental signal in the transmit band, removing any harmonics or mixing products outside of the band. The band filter 240 has a finite attenuation of unwanted signals relative to wanted signals ("rejection"); for example, 40 dB rejection in the receive band is typical of modern transmit band filters. After passing through the transmit band filter 240, the transmitted signal is only slightly attenuated, but any mixing spur present that lies, for example, in the receive band, are attenuated by the rejection of the filter.

The transmitted and spurious signals are then directed to an antenna 250. The antenna 250 transmits and receives in both the transmit and receive bands, and possibly also in other bands, depending on its design and operating environment. Thus, spurious signals present are radiated and may affect nearby radios, and the radiated spurious signals may be expected to be subject to regulatory and standards-based constraints. In addition, the transmitted signal encounters a receive band filter 260. The receive band filter is configured to reject the transmitted signal so that the wanted received signal is not blocked. However, any spurious signals within the receive band can be expected to pass through the receive band filter with little attenuation, and thus may desensitize the receiver if they lie on or near a wanted frequency. Further, the transceiver includes a low-noise amplifier 270, a receiver 280 and baseband circuitry 290.

It is important to note that in many commercial handsets and related devices, a number of transmitters and receivers operative in differing bands may be collocated, though in current practice only one pair of transmit and receive bands is used at any given time. The transmit and receive band filters 240, 260 are shown as distinct components in FIG. 2 for clarity, but in actual implementations they may be incorporated in to a single duplexer or multiplexer, possibly along with other filter structures for the aforementioned multiple bands.

With the aid of a reference configuration, one may then proceed to examine for each possible range of switching frequencies whether mixing products are expected to result in specific frequency ranges, and if so, what amplitude of DC supply ripple is permissible while remaining within the applicable limits for spurious power or radio performance.

The greatest susceptibility to a spurious signal, and thus the most demanding requirement, occurs when the spurious signal lies within the wanted frequency channel of the receiver, since in that case no rejection can be expected and the spurious signal adds directly to the received signal. In the case illustrated above, where transmitted signals are present simultaneously with attempted reception of signals, mixing products with the carrier may be present in the received channel. In many cellular communications standards the wanted receive frequency channel is offset by a constant amount from the nominal transmit channel; for example, in the US cellular band (band 5), the nominal handset receive channel is 45 MHz higher than its current transmit channel, regardless of which channel is being used to transmit. The specific receive channel at any given time is referred to as the paired channel, to distinguish it from other receive channels, which may be in use in neighboring radios. Thus, the paired channel is examined first, and in general choices of frequencies which might lead to mixing products in the paired receive channel will be excluded due to the demanding requirements for spurious amplitude.

Spurious signals within the transmit band are next examined. Signals within the transmit band are not attenuated significantly by the transmit band filter, and will be radiated into the environment; they are thus subject to regulatory and standards constraints. Each candidate range of frequencies may be examined to establish whether mixing spurs may lie within the transmit band; if so, the maximum allowed ripple amplitude may be estimated based on the constraints and measured relationship between supply ripple and mixing products.

Spurious signals lying in the receive band, but not within the wanted (paired) channel, are next examined. In this case, the radiated spurious signals should be reduced by the rejection of the transmit band filter, and resulting constraints may therefore be less stringent.

Finally, variations in the frequency of the switch-mode power supply should be accounted for. There are two somewhat different sources of variation. The average switching frequency may vary due to differences from one unit to another, variations in the supply voltage (e.g. from a battery or external power source), and variations in ambient and operating temperature. In addition, the frequency of any oscillator undergoes random variations with time during operation, which can be regarded as noise at frequencies offset from the nominal frequency of oscillation: "phase noise". In examining the effects of these variations, it should be recalled that the transmitted signal is generally modulated, and thus has a finite and possibly substantial bandwidth due to modulation, which must be added to the receive channel bandwidth.

At the completion of this set of steps, each candidate range of frequencies may be assigned a figure of merit indicate of whether harmonics and mixing products lie in desired bands, and if so how stringent the resulting requirements on DC supply ripple are found to be, leading to optimal selection of the best switching frequency for a given application.

Figure 3:
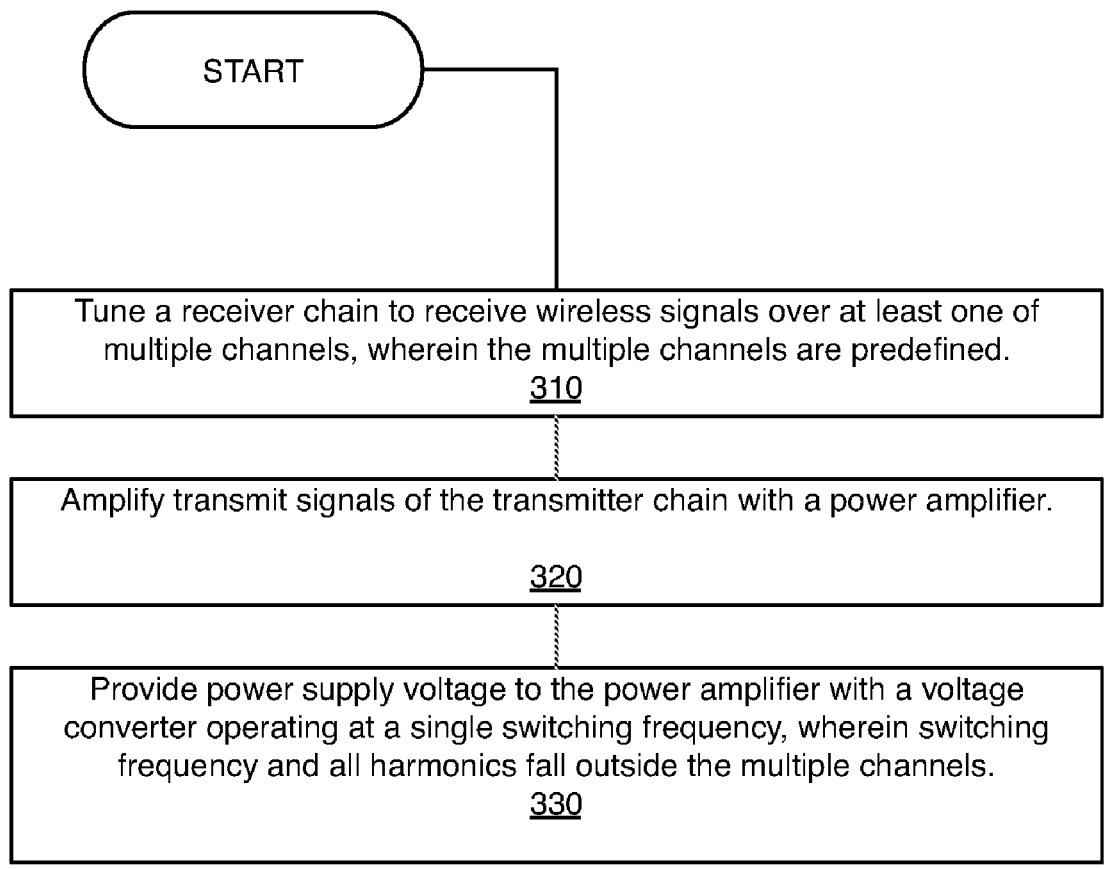
FIG. 3 is a flow chart that includes steps of an example of a method of receiving and transmitting wireless signals according to at least some of the described embodiments.

FIG. 3 is a flow chart that includes steps of an example of a method of receiving and transmitting wireless signals according to at least some of the described embodiments. A first step 310 includes tuning a receiver chain to receive wireless signals over at least one of multiple channels, wherein the multiple channels are predefined. A second step 320 includes amplifying transmit signals of the transmitter chain with a power amplifier. A third step 330 includes a voltage converter providing a power supply voltage to the power amplifier, the voltage converter operating at a single switching frequency; wherein the single switching frequency, and all harmonics of the single switching frequency fall outside of the multiple channels.

To further clarify the described embodiments, a typical example is examined in detail. In this example, preferred frequencies of operation are established for a high-frequency converter intended for use in a WCDMA handset, according to the standards established by the 3GPP working group. The bands to be considered are bands 1, 2, 3, 5 and 8, shown in the table of FIG. 4. 3GPP is a trade organization that attempts to define international mobile wireless standards. The exemplary 3GPP bands shown in FIG. 4 include band 1 IMT (International Mobile Telecommunications), band 2 PCS (Personal Communications System), band 3 DCS (Digital Cellular Service), band 5 Cell, and band 8 GSM (Global System for Mobile Communications).

In connection with this table, it will be understood that from the point of view of the mobile handset, the Uplink band is its Transmit (TX) band, and the Downlink band is its Receive (RX) band. Thus, a handset operating in the PCS band (band 2) will transmit on a channel in the 60-MHz-wide band between 1850 and 1910 MHz, and receive on a paired channel 80 MHz higher, thus between 1930 and 1990 MHz. The transmitted and received signals are nominally 3.84 MHz wide, and successive channels are separated by 5 MHz.

Following the procedure of the flow chart of FIG. 1, harmonics in the bands are first examined. In the exemplary case, for each candidate switching frequency, all integer harmonic frequencies can be examined to establish whether they lie within one or more of the uplink (TX) bands shown in the table of FIG. 4. A portion of an appropriate comparison table is shown in the table of FIG. 5. Each harmonic of the fundamental frequency is tested against each uplink band described in the table of FIG. 4. A '1' indicates that the subject harmonic frequency lies within the cited band; a '0' in the cell indicates that it lies outside of the cited band. The table of FIG. 5 is shown to clearly demonstrate the procedure, but the procedure could be implemented in a conventional software program.

Figure 6:
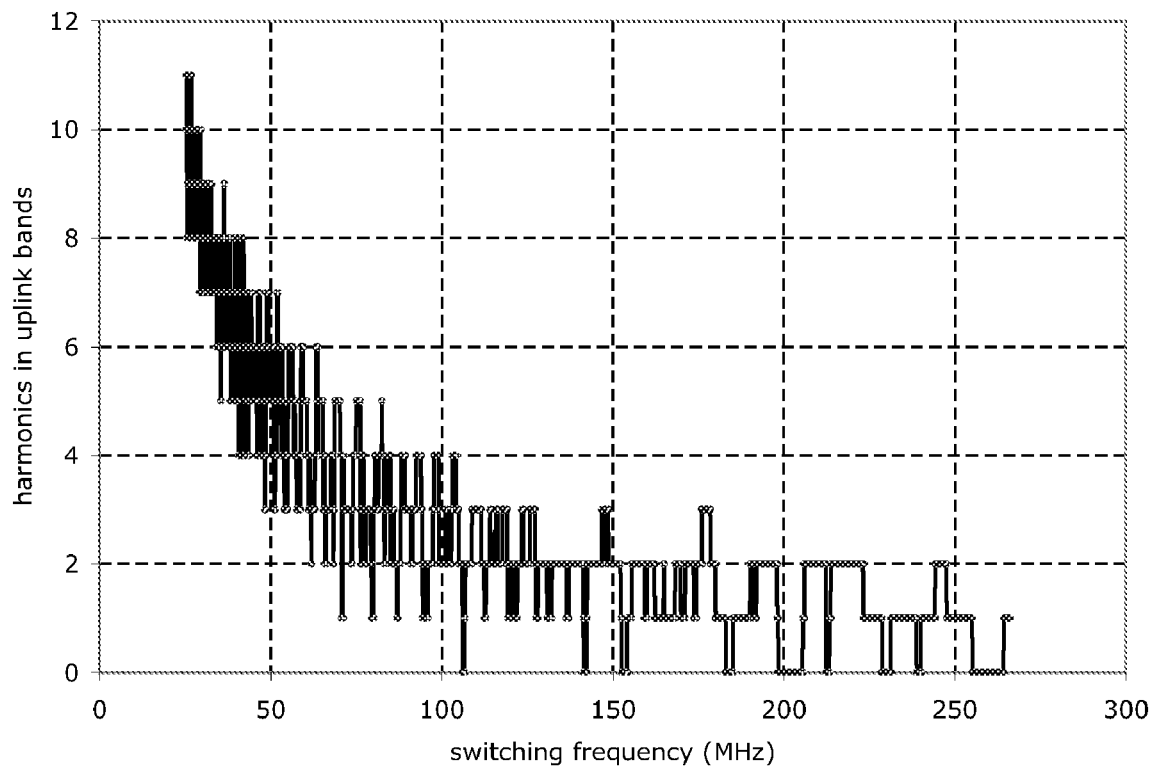
FIG. 6 is a plot that shows an example of harmonics in uplink bands as a function of switching frequency.

The resulting total harmonics in all TX (uplink) bands as a function of switching frequency are summarized in FIG. 6. The total number of harmonics that are in-band decreases rapidly for frequencies up to about 70 MHz, and more slowly thereafter. Switching frequencies above 100 MHz generally display 2 or 3 in-band harmonics; switching frequencies of 142, 153, and 154 MHz, for example, have no uplink in-band harmonics at all.

Figure 7:
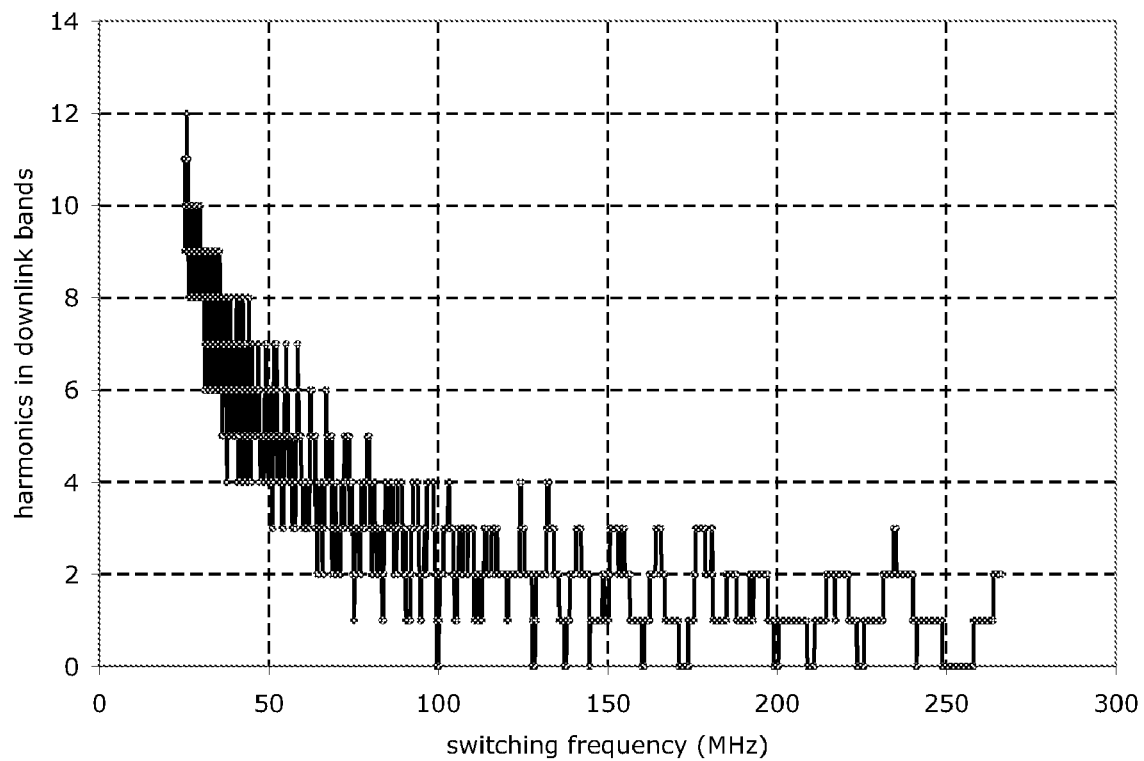
FIG. 7 is a plot that shows an example of harmonics in downlink bands as a function of switching frequency.
Figure 8:
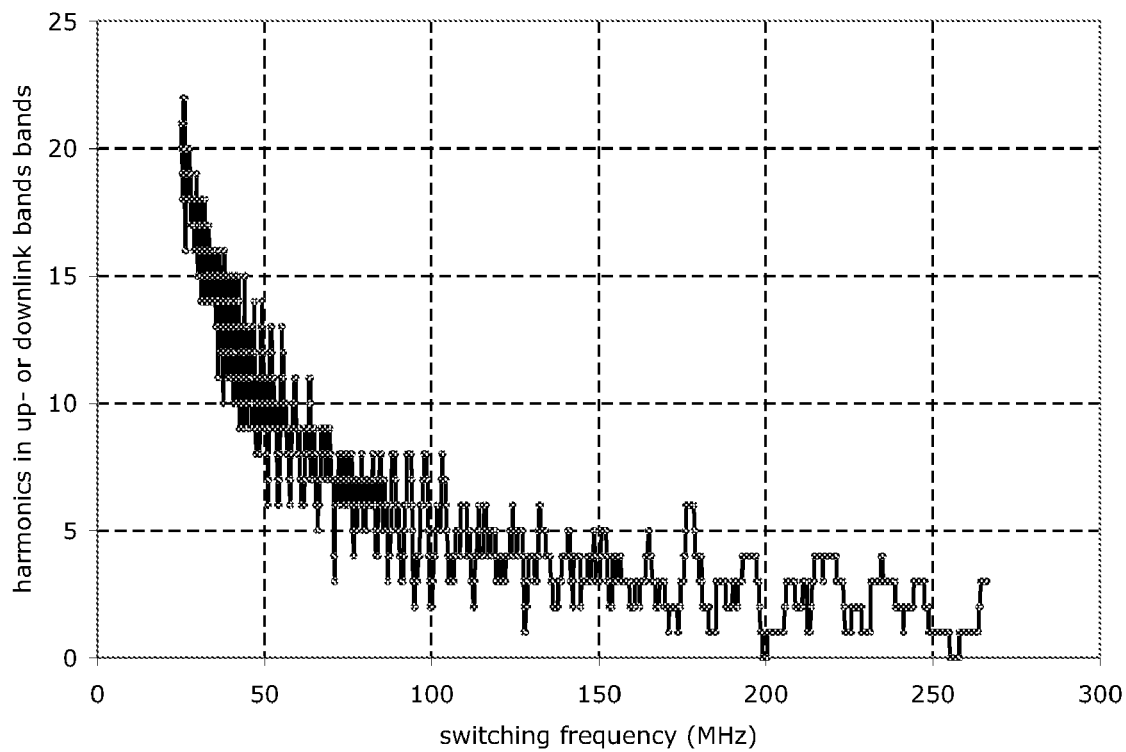
FIG. 8 is a plot that shows an example of harmonics in uplinks or downlink bands as a function of switching frequency.

A similar procedure may be followed for the downlink (RX) bands. The results for the exemplary band set are depicted in FIG. 7. The overall behavior is similar to that observed for the uplink bands, in that the total number of harmonics falls rapidly for switching frequencies up to about 70 MHz and thereafter decreases more slowly. Switching frequencies with no harmonics in the downlink bands are found, for example, at 91, 100, 128, 160 MHz, and between 167 and 173 MHz. FIG. 8 is a plot that shows an example of harmonics in uplinks or downlink bands as a function of switching frequency. FIG. 9 includes a table that lists in detail the frequency bands for which no harmonics are present in the TX, RX, or both band sets. The frequencies described in which no harmonics of the switching frequency are present in the TX or RX bands, or in both can be examined. The results are depicted in table of FIG. 11.

The method next proceeds to examine mixing products of the carrier and switching frequency. The most demanding requirement is that for a spurious signal lying on the paired receive band. Since the mixing products are offset from the carrier frequency by the switching frequency, this will occur when the switching frequency is equal to or close to the TX/RX spacing.

In order to avoid desensitization of the receiver, spurs on the paired channel should be well below the thermal noise present in the channel. For example, if spurious power is limited to 15 dB below the noise floor, receive sensitivity will only be impacted by about 0.1 dB. The thermal noise in a channel is obtained by multiplying the ambient thermal noise per Hz by the effective noise bandwidth of the channel. The ambient thermal noise at room temperature, obtained from the Boltzmann distribution, is well known to be about $4 \times 10^{-21}$ W/Hz or $-174$ dBm/Hz. For a nominal 3.84 MHz receive bandwidth, the thermal noise at room temperature is approximately $-108$ dBm ($1.5 \times 10^{-14}$ W). Assuming a typical noise figure of 8 dB for the receiver, the actual input-referred noise floor is about $[-108+8]=-100$ dBm. Therefore, any spurious signal within this band should be less than $-115$ dBm ($3 \times 10^{-15}$ W).

Since the transmitted mixing product from the power amplifier is expected to pass through the transmit band filter, the rejection of the band filter may be included in the computation of the maximum allowed signal level. Using a reasonable estimate of 40 dB for the transmit band filter rejection in the receive band, mixing products in the paired channel must be lower than $(-115+40)=-75$ dBm ($3 \times 10^{11}$ W). For a nominal transmitted power of 24 dBm, this corresponds to a spur level of roughly 100 dB below the carrier power ($-100$ dBc). This is a very demanding requirement, so it is preferred that spurs on the paired channel be avoided altogether.

With these considerations in mind, various possible values for the switching frequency may be examined, as summarized in the table of FIG. 10. In specific frequency ranges, a given harmonic of the switching frequency may mix with the carrier to produce a spurious signal on or close to the paired channel for one of the bands under consideration. For example, for range 1, extending from 20 to 25 MHz, mixing products of the second harmonic of the switching frequency with the carrier are on or close to the paired channel frequency for band 5. Similarly, in range 2, extending from 25 to 28.33 MHz, the third harmonic of the switching frequency when mixed with the carrier lies on or close to the paired channel for band 2. In this fashion, all the frequency ranges where the paired channel of one of the subject bands is impacted by any harmonic of the switching frequency (including the fundamental) may be listed, as has been done in FIG. 10. Those frequency ranges for which none of the subject bands is impacted may then be identified, and are summarized in the rightmost column of the table of FIG. 10.

The table of FIG. 10 shows examples of switching frequency ranges, and a corresponding impact on pair channels. The following ranges have no mixing products on the paired bands up to the third harmonic:

28.4 to 29.9
33.33 to 37.5 MHz
50 to 61.7 MHz
65 to 75 MHz
85 to 90 MHz
100 to 115 MHz
135 to 185 MHz
>195 MHz.

Mixing products in the transmit band are next examined. The maximum transmit power allowed by the 3GPP specification outside of the intended channel is $-50$ dBm in 3.84 MHz. No benefit from filtering is expected, since the spur is within the transmit band and will pass through the transmit band filter. Allowing a 6 dB margin to ensure compliance over variations in process, voltage, and temperature, and assuming a maximum output power of 24 dBm, the mixing product must be 80 dB below the carrier power. For an exemplary commercial power amplifier, the inventors have found that the mixing product amplitude is linear in the ripple amplitude, and equal to $-68$ dBc for an input ripple of 29 mV peak-to-peak. Thus, to achieve an output mixing product amplitude of $-80$ dBc, input ripple must be reduced by a factor of 12 dB (0.25 for a voltage measurement), to about 7.3 mV peak-to-peak.

In order to ensure that mixing products do not fall within the transmit band regardless of the transmit channel in use, it is sufficient to require that the switching frequency exceed the RF bandwidth of a specific band, listed in the rightmost column of the table of FIG. 4. Based on the analysis presented in the table of FIG. 10, we may extract frequency ranges in which the paired receive channel is not impacted. These ranges may then be examined for transmit band mixing products. The results of this procedure are summarized in the table of FIG. 12. The frequency ranges from 85.1 to 89.9 MHz, and 100.1 to 184.9 MHz, have no spurs in the transmit band or the paired channel for all bands considered. In addition, frequencies from 195.1 MHz to 265 MHz (the highest frequency included in this analysis) are also free of transmit-band spurs for the examined bands.

Next, the impact of spurious outputs in the unpaired receive bands must be accounted for. The sum of the carrier with each harmonic of the switching frequency must be compared to the minimum and maximum separations of the uplink and downlink bands. For example, considering the PCS band, the smallest separation between the bands is at the upper limit of the TX (uplink) band, (1930-1910)=20 MHz. The largest separation is between the lower limit of the TX band and the upper limit of the RX band, (1990-1850)=140 MHz. Any harmonic of the switching frequency lying between these two values, when added to the carrier, may lead to spurious transmissions at frequencies within the RX band, for at least some transmit channel selections. The results of this examination are summarized in the table of FIG. 13, in which the contents of each cell list those integer harmonics of fundamental frequencies within the cited range whose sum with the carrier lies in the specified downlink band. No frequency ranges <265 MHz are found in which spurs are simultaneously avoided in the TX band, RX band, and paired channel for all band sets under consideration.

Note that, referring to the reference configuration shown in FIG. 2, a transmitted signal in the RX band is expected to be rejected by the Transmit Band filter 240, and thus reduced in power by on the order of 40 dB.

Figure 14:
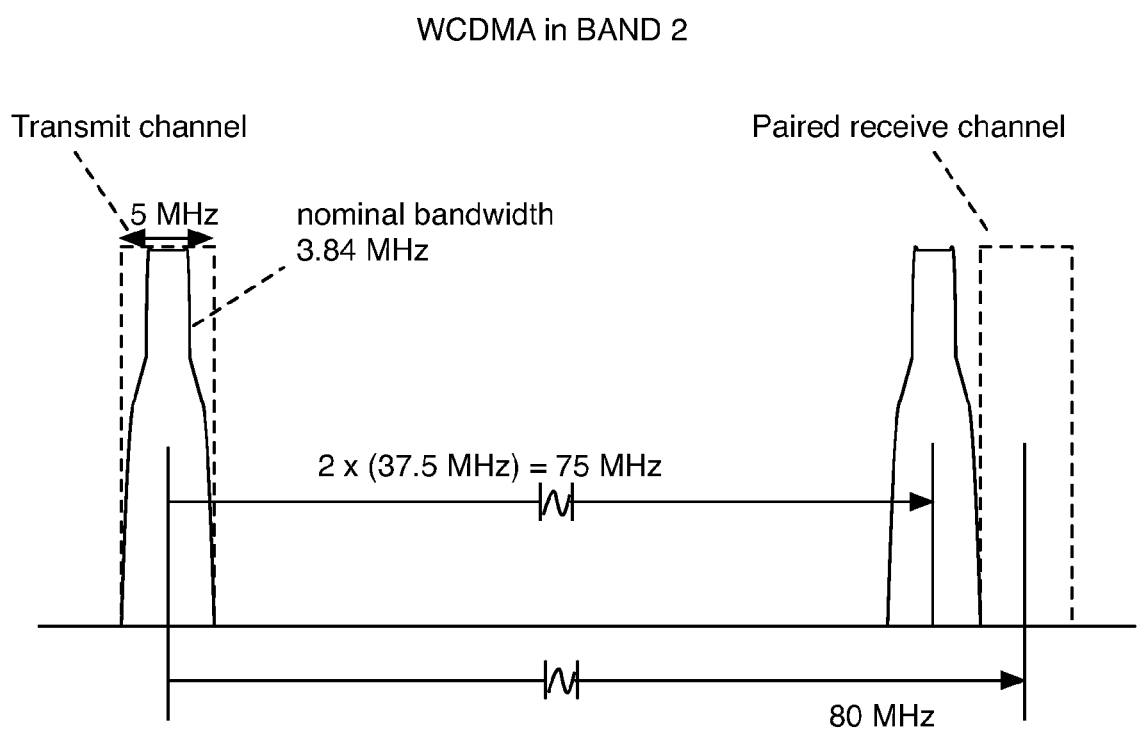
FIG. 14 shows a frequency spectrum that depicts how combined effects of frequency variation and phase noise can cause mixing products to enter paired receive channels.

Finally, the effects of frequency variation must be accounted for. Consider the specific example of a nominal switching frequency of 35.4 MHz, selected from range 3a, operating in band 2 (PCS). It is expected that the average switching frequency may vary from one unit to another and with changes in operating voltage and temperature by about 3.6 MHz, that is from a minimum of 33.6 to a maximum of 37.2 MHz. The average switching frequency is not perfectly maintained on an instantaneous basis, so phase noise at frequencies higher than 37.2 MHz must be regarded as present when the switching frequency is at its maximum value. For offsets of more than 0.3 MHz from this maximum value, the upper edge of the mixing product will enter the 5-MHz paired receive channel, as depicted in FIG. 14. Recall that the requirement for noise in the paired receive channel is about 20 dB more stringent than that for spurious signals in the transmit band (−100 dBc vs. −80 dBc). To ensure that spurious levels remain acceptable, we may conservatively require that the power of all signals more than 0.3 MHz above the nominal switching frequency—that is, the integrated phase noise from 0.3 MHz offset to the upper band edge at 4.14 MHz—be at least 20 dB below the power of the main switching frequency.

FIG. 15 shows an example of a switching voltage regulator operating at a selected switching frequency ($f_{SW}$). This example of a switching voltage regulator is a buck inductive converter. Clearly, the switching voltage regulator can be of a different type. As shown, the exemplary buck inductive converter uses two switches (series switch, shunt switch) and an inductor to convert an input voltage $V_{in}$ to a lower-valued output voltage $V_{out}$. Note that a variety of other switched-mode converter topologies exist for varying applications, capable of both increasing ("boost") and decreasing ("buck") the input voltage. Furthermore, though N-type FET switch devices are indicated in FIG. 15, any appropriate switching means, including N- or P-type FETs or bipolar transistors, can be used.

The states of these switches (series switch, shunt switch) are controlled by voltage waveforms $V_{c,ser}$ and $V_{c,sh}$. The series switch is on (closed) for a time $T_{on}$, during which current flows from the voltage supply (a battery $V_{in}$ in the exemplary converter of FIG. 15) into the output storage inductor $L_{out}$. During this time the current flowing through the output storage inductor increases approximately linearly with time. During a time $T_{off}$, the series switch is turned off (opened). After a brief dead time, required to ensure that the two switches are not both on simultaneously, the shunt switch is turned on (closed). Current flows from ground into the output storage inductor. During this time, the current decreases approximately linearly with time; however, if the inductor is sufficiently large relative to the switching period, the current will not fall to 0. (This is known as continuous mode operation.) Because the current is time-varying, the output voltage will also vary with time; this variation, generally known as voltage ripple, consists of components at the switching frequency and its harmonics. When used to supply a power amplifier, any nonlinear dependence of the amplifier output on supply voltage will give rise to mixing products between the transmitted signal and the ripple components, as discussed above. It should be noted that mixing products and harmonics of the switching frequency can also appear in the output signal due to, for example, unintended coupling between other circuit components or conducting lines in the circuit. At the end of the period $T_{off}$, the series switch is turned on again. The sum of $T_{on}$ and $T_{off}$ is the switching period T. The switching frequency $f_{SW}$=1/T. The duty cycle D is defined as the fraction of the switching period during which the series switch is on:

$$D = \frac{T_{on}}{T_{on} + T_{off}}$$

It may be shown that in steady-state continuous mode operation, if dead times and parasitic resistances can be neglected, the output voltage is proportional to the duty cycle:

$$V_{out} = DV_{in}$$

Since the output voltage is controlled by adjusting the width of the control pulses to the switching elements, this type of control is known as pulse-width modulation or PWM.

As shown, the exemplary switch elements (series switch, shunt switch) are connected the input voltage ($V_{in}$) and the output voltage ($V_{out}$). The output voltage is generated through the use of the energy storage element ($L_{out}$) and through controlled closing and opening of the switch elements at a single switching frequency ($f_{SW}$). As previously described, a power amplifier supply voltage can be generated for a wireless device based upon the output voltage, wherein the single switching frequency ($f_{SW}$), and all harmonics of the single switching frequency fall outside of multiple predefined receive channels of the wireless device.

Although specific embodiments have been described and illustrated, the embodiments are not to be limited to the specific forms or arrangements of parts so described and illustrated.

What is claimed is:

1. A wireless transceiver, comprising:
a transmit chain, the transmit chain comprising a power amplifier;
a receiver chain, the receiver chain tunable to receive wireless signals over at least one of multiple channels, wherein the multiple channels are predefined;
a voltage converter, the voltage converter providing a supply voltage to the power amplifier, the voltage converter operating at a single switching frequency; wherein
the single switching frequency, and all harmonics of the single switching frequency fall outside of the multiple channels.

2. The transceiver of claim 1, wherein the multiple channels comprise at least two of bands 1, 2, 3, 5, 8 as defined by 3GPP (3rd Generation Partnership Project).

3. The transceiver of claim 2, wherein the single switching frequency is selected from within a range of 90.5 MHz to 91.7 MHz.

4. The transceiver of claim 2, wherein the single switching frequency is selected from within a range of 99.5 MHz to 100.2 MHz.

5. The transceiver of claim 2, wherein the multiple channels comprise paired receive channels.

6. The transceiver of claim 5, further comprising mixing products between the single switching frequency and carrier frequencies of the transceiver falling outside of the paired receive channels.

7. The transceiver of claim 6, wherein the single switching frequency is selected from within a range of 171 MHz to 173.8 MHz.

8. The transceiver of claim 1 further comprising harmonics of the single switching frequency falling outside of transmitter bands of the transceiver.

9. The transceiver of claim 8, further comprising mixing products between the single switching frequency and carrier frequencies of the transceiver falling outside of paired receive channels.

10. The transceiver of claim 9, further comprising harmonics of the single switching frequency falling outside of at least two transmit bands of bands 1, 2, 3, 5, 8 as defined by 3GPP (3rd Generation Partnership Project).

11. The transceiver of claim 10, wherein the single switching frequency is selected from within a range of 255.0 MHz to 257.8 MHz.

12. The transceiver of claim 10, wherein the single switching frequency is selected from within a range of 199.0 MHz to 200.5 MHz.

13. A wireless transceiver, comprising:
a transmit chain, the transmit chain comprising a power amplifier;
a receiver chain, the receiver chain tunable to receive wireless signals over at least one of multiple receive channels, wherein the multiple receive channels are predefined and at any time each of the multiple receive channels is a paired channel;
a voltage converter, the voltage converter providing a supply voltage to the power amplifier, the voltage converter operating at a single switching frequency; wherein
wherein mixing products between transmitter carrier frequencies and the single switching frequency, and the harmonics of the single switching frequency, are located outside of paired receive channels.

14. The transceiver of claim 13, wherein the multiple channels comprise at least two of bands 1, 2, 3, 5, 8 as defined by 3GPP (3rd Generation Partnership Project).

15. The transceiver of claim 14, further comprising the single switching frequency operative between 33.33 MHz and 37.5 MHz.

16. The transceiver of claim 14, further comprising the single switching frequency operative between 28.33 MHz and 30.0 MHz.

17. A method of receiving and transmitting wireless signals, comprising:
tuning a receiver chain to receive wireless signals over at least one of multiple channels, wherein the multiple channels are predefined;
amplifying transmit signals of the transmitter chain with a power amplifier;
a voltage converter providing a power supply voltage to the power amplifier, the voltage converter operating at a single switching frequency;
wherein the single switching frequency, and all harmonics of the single switching frequency fall outside of the multiple channels.

18. A voltage regulator, comprising:
switch elements connected between an input voltage and an output voltage;
means for generating the output voltage through the use of a energy storage element, and through controlled closing and opening of the switch elements at a single switching frequency;
means for generating a power amplifier supply voltage for a wireless device based upon the output voltage; wherein
the single switching frequency, and all harmonics of the single switching frequency fall outside of multiple predefined receive channels of the wireless device.

19. The voltage regulator of claim 18, wherein the multiple predefined receive channels comprise at least two of bands 1, 2, 3, 5, 8 as defined by 3GPP (3rd Generation Partnership Project).

20. The voltage regulator of claim 19, wherein the single switching frequency is selected from within a range of 90.5 MHz to 91.7 MHz, or from within a range of 99.5 MHz to 100.2 MHz.

21. The voltage regulator of claim 19, wherein the single switching frequency is selected from within a range of 171.00 to 173.8 MHz.

22. The voltage regulator 19, further comprising mixing products between the single switching frequency and carrier frequencies of a transceiver falling outside of paired receive channels.

23. The voltage regulator of claim 22, wherein the single switching frequency is selected from within a range of 199 MHz to 200.5 MHz, or within a range of 208.9 MHz to 211 MHz.

24. The voltage regulator of claim 22, wherein the single switching frequency is selected from within a range of 223.6 MHz to 225.6 MHz, or within a range of 248.8 MHz to 257.8 MHz.

* * * * *